US006855654B2

(12) United States Patent
Kissin et al.

(10) Patent No.: US 6,855,654 B2
(45) Date of Patent: Feb. 15, 2005

(54) BIMETALLIC CATALYST FOR ETHYLENE POLYMERIZATION REACTIONS WITH UNIFORM COMPONENT DISTRIBUTION

(75) Inventors: Yury V. Kissin, East Brunswick, NJ (US); Robert I. Mink, Warren, NJ (US); Thomas E. Nowlin, West Windsor Township, NJ (US); Pradeep P. Shirodkar, Belle Mead, NJ (US); Sandra D. Schregenberger, Neshanic, NJ (US); Grace O. Tsien, Colonia, NJ (US)

(73) Assignee: ExxonMobil Oil Corporation, Irving, TX (US)

( * ) Notice: Subject to any disclaimer, the term of this patent is extended or adjusted under 35 U.S.C. 154(b) by 0 days.

(21) Appl. No.: 10/244,930

(22) Filed: Sep. 16, 2002

(65) Prior Publication Data

US 2003/0017938 A1 Jan. 23, 2003

Related U.S. Application Data

(63) Continuation of application No. 08/555,816, filed on Nov. 9, 1995, now Pat. No. 6,486,089.

(51) Int. Cl.$^7$ .............................. C08F 4/44; C08F 4/642
(52) U.S. Cl. ..................... 502/111; 502/104; 502/113; 502/115; 502/117; 502/119; 502/120; 502/125; 502/129; 526/114; 526/119
(58) Field of Search ................................. 502/104, 119, 502/113, 111, 115, 117, 120, 125, 129; 526/114, 119

(56) References Cited

U.S. PATENT DOCUMENTS

| | | | |
|---|---|---|---|
| 2,924,593 A | 2/1960 | Breslow .................... 260/94.9 |
| 3,135,809 A | 6/1964 | Bosmajian .................. 260/650 |
| 3,242,099 A | 3/1966 | Manyik et al. ............. 252/429 |
| 3,950,269 A | 4/1976 | Setterquist ................. 252/430 |
| 4,188,470 A | 2/1980 | Collina et al. ................. 526/64 |
| 4,299,936 A | 11/1981 | Candlin et al. ............. 526/119 |
| 4,310,648 A | 1/1982 | Shipley et al. ............. 526/114 |
| 4,324,691 A | 4/1982 | Hartshorn et al. ...... 252/429 B |
| 4,329,252 A | 5/1982 | Gavens et al. .......... 252/429 B |
| 4,338,424 A | 7/1982 | Morita et al. ................. 526/65 |
| 4,356,111 A | 10/1982 | Shipley et al. .......... 252/429 B |
| 4,399,053 A | 8/1983 | Shipley et al. .......... 252/429 B |
| 4,402,861 A | 9/1983 | Hoff ........................ 252/429 B |
| 4,404,344 A | 9/1983 | Sinn et al. .................. 526/160 |
| 4,414,369 A | 11/1983 | Kuruda et al. ................ 526/65 |
| 4,420,592 A | 12/1983 | Kato et al. ..................... 526/65 |
| 4,446,288 A | 5/1984 | Hoff ............................ 526/129 |
| 4,518,751 A | 5/1985 | Mizogami et al. .......... 526/114 |
| 4,525,550 A | 6/1985 | Warzelhan et al. ......... 526/116 |
| 4,530,914 A | 7/1985 | Ewen et al. ................. 502/113 |
| 4,536,484 A | 8/1985 | Lacombe et al. ............. 502/62 |
| 4,542,199 A | 9/1985 | Kaminsky et al. .......... 526/160 |
| 4,554,265 A | 11/1985 | Graves ....................... 502/113 |
| 4,568,659 A | 2/1986 | Warzelhan et al. .......... 502/111 |
| 4,578,373 A | 3/1986 | Graves ........................ 502/113 |
| 4,618,660 A | 10/1986 | Graves ........................ 526/114 |
| 4,658,078 A | 4/1987 | Slaugh et al. ................ 585/512 |
| 4,659,685 A | 4/1987 | Coleman, III ............... 502/113 |
| 4,665,047 A | 5/1987 | Slaugh et al. ............... 502/108 |
| 4,701,432 A | 10/1987 | Welborn, Jr. ................ 502/113 |
| 4,703,094 A | 10/1987 | Raufast ........................ 526/65 |

(List continued on next page.)

FOREIGN PATENT DOCUMENTS

| | | |
|---|---|---|
| EP | 0516458 | 4/1992 |
| EP | 0515132 | 5/1992 |
| WO | WO95/13871 | 5/1995 |

OTHER PUBLICATIONS

US 5,242,876, 9/1993, Shamshoum et al. (withdrawn)

Kaminsky et al, Angew, Chem. Int. Ed. Engl. vol. 15 (1976), p. 629.

Kaminsky, Walter, "Living Polymers" on Polymerization with Extremely Productive Ziegler Catalysts, Angewandte Chemie International Edition in English 19/5 (1980), p. 390–392.

Kaminsky, Walter, "Bis(cyclopentadienyl)zirkon– Verbindungen und Aluminoxan als Ziegler–Katalysatoren für die Polymerisation und Copolymerisation von Olefinen", Makromol. Chem., Rapid Commun. 4, p. 417–421 (1983).

(List continued on next page.)

*Primary Examiner*—Roberto Rabago
(74) *Attorney, Agent, or Firm*—Louis N. Moreno; Andrew B. Griffis; Mandi B. Milbank

(57) ABSTRACT

The invention relates to a process for uniformly dispersing a transition metal metallocene complex on a carrier comprising
(1) providing silica which is porous and has a particle size of 1 to 250 microns, having pores which have an average diameter of 50 to 500 Angstroms and having a pore volume of 0.5 to 5.0 cc/g;
(2) slurrying the silica in an aliphatic solvent having a boiling point less than 110° C.;
(3) providing a volume of a solution comprising the metallocene complex, alumoxane of formulas R—(Al(R)—O—)$_x$—AlR$_2$ for oligomeric linear alumoxanes and (—Al(R)—O—)$_y$ for cyclic alumoxanes wherein x is 1–40, y is 3–40, and R is a C$_1$–C$_8$ alkyl group in an aromatic and a solvent wherein the volume of solution is less than that required to form a slurry of the silica, wherein the concentration of alumoxane, expressed as Al weight percent, is 5 to 20;
(4) contacting the silica slurry (2) with said volume of said solution (3) and allowing the solution to impregnate the pores of silica and, to disperse the metallocene in and on the carrier;
(5) evaporating the solvents from the contacted and impregnated silica to recover dry free-flowing catalyst particles.

18 Claims, No Drawings

U.S. PATENT DOCUMENTS

| | | | |
|---|---|---|---|
| 4,707,530 A | 11/1987 | Johnson | 526/129 |
| 4,710,552 A | 12/1987 | Bachl et al. | 526/116 |
| 4,752,597 A | 6/1988 | Turner | 502/104 |
| 4,769,510 A | 9/1988 | Kaminsky et al. | 585/512 |
| 4,794,096 A | 12/1988 | Ewen | 502/117 |
| 4,808,561 A | 2/1989 | Welborn, Jr. | 502/104 |
| 4,814,540 A | 3/1989 | Watanabe et al. | 585/523 |
| 4,820,786 A | 4/1989 | Bacskai | 526/152 |
| 4,871,704 A | 10/1989 | Kohara et al. | 502/114 |
| 4,874,734 A | 10/1989 | Kioka et al. | 502/104 |
| 4,897,455 A | 1/1990 | Welborn, Jr. | 526/129 |
| 4,910,272 A | 3/1990 | Marchand et al. | 526/129 |
| 4,912,075 A | 3/1990 | Chang | 502/107 |
| 4,914,253 A | 4/1990 | Chang | 585/523 |
| 4,918,038 A | 4/1990 | Samuels et al. | 502/112 |
| 4,921,825 A | 5/1990 | Kioka et al. | 502/104 |
| 4,923,833 A | 5/1990 | Kioka et al. | 502/9 |
| 4,925,821 A | 5/1990 | Chang | 502/107 |
| 4,931,517 A | 6/1990 | Fujita | 526/128 |
| 4,933,403 A | 6/1990 | Kaminsky et al. | 526/160 |
| 4,935,397 A | 6/1990 | Chang | 502/117 |
| 4,937,217 A | 6/1990 | Chang | 502/111 |
| 4,937,301 A | 6/1990 | Chang | 526/128 |
| 4,939,217 A | 7/1990 | Stricklen | 526/114 |
| 4,952,540 A | 8/1990 | Kioka et al. | 502/9 |
| 4,962,248 A | 10/1990 | Winter et al. | 585/12 |
| 4,962,262 A | 10/1990 | Winter et al. | 585/512 |
| 4,980,330 A | 12/1990 | Marchand et al. | 502/115 |
| 5,001,205 A | 3/1991 | Hoel | 526/128 |
| 5,006,500 A | 4/1991 | Chang | 502/107 |
| 5,008,228 A | 4/1991 | Chang | 502/111 |
| 5,021,595 A | 6/1991 | Datta | 556/42 |
| 5,023,388 A | 6/1991 | Luker | 585/9 |
| 5,026,797 A | 6/1991 | Takahashi | 526/124 |
| 5,032,562 A | 7/1991 | Lo et al. | 502/111 |
| 5,043,515 A | 8/1991 | Slaugh et al. | 585/512 |
| 5,049,535 A | 9/1991 | Resconi et al. | 502/117 |
| 5,055,438 A | 10/1991 | Canich | 502/117 |
| 5,057,475 A | 10/1991 | Canich et al. | 502/104 |
| 5,066,631 A | 11/1991 | Sangokoya et al. | 502/152 |
| 5,077,255 A | 12/1991 | Welborn, Jr. | 502/104 |
| 5,082,817 A | 1/1992 | Albizzati et al. | 502/102 |
| 5,086,024 A | 2/1992 | Crapo et al. | 502/117 |
| 5,086,135 A | 2/1992 | Kissin | 526/151 |
| 5,087,788 A | 2/1992 | Wu | 585/512 |
| 5,091,352 A | 2/1992 | Kioka et al. | 502/103 |
| 5,120,696 A | 6/1992 | Tsutsui et al. | 502/113 |
| 5,122,491 A | 6/1992 | Kioka et al. | 502/117 |
| 5,126,301 A | 6/1992 | Tsutsui et al. | 502/108 |
| 5,126,303 A | 6/1992 | Resconi et al. | 502/117 |
| 5,132,262 A | 7/1992 | Rieger et al. | 502/117 |
| 5,132,381 A | 7/1992 | Winter et al. | 526/160 |
| 5,145,819 A | 9/1992 | Winter et al. | 502/117 |
| 5,147,949 A | 9/1992 | Chang | 526/129 |
| 5,157,008 A | 10/1992 | Sangokoya et al. | 502/111 |
| 5,162,278 A | 11/1992 | Razavi | 502/152 |
| 5,171,799 A | 12/1992 | Kioka et al. | 26/21 |
| 5,171,871 A | 12/1992 | Miyashita | 556/27 |
| 5,171,919 A | 12/1992 | Watanabe et al. | 585/523 |
| 5,173,464 A | 12/1992 | Pettijohn et al. | 502/104 |
| 5,182,244 A | 1/1993 | Pettijohn | 502/110 |
| 5,189,000 A | 2/1993 | Masi et al. | 502/113 |
| 5,196,496 A | 3/1993 | Galimberti et al. | 526/348.6 |
| 5,198,399 A | 3/1993 | Hoff et al. | 502/104 |
| 5,206,197 A | 4/1993 | Campbell, Jr. | 502/103 |
| 5,206,199 A | 4/1993 | Kioka et al. | 502/117 |
| 5,208,304 A | 5/1993 | Waymouth | 526/164 |
| 5,216,095 A | 6/1993 | Dolle et al. | 526/127 |
| 5,223,465 A | 6/1993 | Ueki et al. | 502/117 |
| 5,225,500 A | 7/1993 | Elder et al. | 526/127 |
| 5,234,878 A | 8/1993 | Tsutsui et al. | 502/103 |
| 5,238,891 A | 8/1993 | Miro | 502/104 |
| 5,238,892 A | 8/1993 | Chang | 502/111 |
| 5,240,894 A | 8/1993 | Burkhardt et al. | 502/108 |
| 5,241,025 A | 8/1993 | Hlatky et al. | 526/129 |
| 5,258,342 A | 11/1993 | Luciani et al. | 502/107 |
| 5,260,244 A | 11/1993 | Pettijohn | 502/115 |
| 5,278,117 A | 1/1994 | Luciani et al. | 502/113 |
| 5,281,679 A | 1/1994 | Jejelowo et al. | 526/114 |
| 5,304,523 A | 4/1994 | Razavi | 502/152 |
| 5,317,036 A | 5/1994 | Brady, III et al. | 523/223 |
| 5,324,800 A | 6/1994 | Welborn, Jr. et al. | 526/160 |
| 5,329,033 A | 7/1994 | Spaleck et al. | 556/53 |
| 5,332,706 A | 7/1994 | Nowlin et al. | 502/107 |
| 5,340,786 A | 8/1994 | Tsutsui et al. | 502/117 |
| 5,347,025 A | 9/1994 | Yamada et al. | 556/11 |
| 5,348,926 A | 9/1994 | Yamada et al. | 502/117 |
| 5,350,817 A | 9/1994 | Winter et al. | 526/119 |
| 5,359,015 A | 10/1994 | Jejelowo | 526/114 |
| 5,372,682 A | 12/1994 | Devore et al. | 204/72 |
| 5,373,072 A | 12/1994 | Chang | 526/129 |
| 5,374,700 A | 12/1994 | Tsutsui et al. | 526/348.3 |
| 5,384,298 A | 1/1995 | Inahara et al. | 502/104 |
| 5,385,877 A | 1/1995 | Fujita et al. | 502/103 |
| 5,395,810 A | 3/1995 | Shamshoum et al. | 502/113 |
| 5,399,636 A | 3/1995 | Alt et al. | 526/129 |
| 5,409,874 A | 4/1995 | Imuta et al. | 502/103 |
| 5,412,131 A | 5/1995 | Sangokoya | 556/175 |
| 5,416,053 A | 5/1995 | Bai et al. | 502/128 |
| 5,416,178 A | 5/1995 | Winter et al. | 526/160 |
| 5,416,179 A | 5/1995 | Welch et al. | 526/160 |
| 5,422,325 A | 6/1995 | Jejelowo et al. | 502/104 |
| 5,434,116 A | 7/1995 | Sone et al. | 502/103 |
| 5,436,305 A | 7/1995 | Alt et al. | 526/160 |
| 5,451,649 A | 9/1995 | Zenk et al. | 526/160 |
| 5,453,475 A | 9/1995 | Rieger et al. | 526/160 |
| 5,455,316 A | 10/1995 | Tsutsui et al. | 526/114 |
| 5,455,365 A | 10/1995 | Winter et al. | 556/7 |
| 5,459,217 A | 10/1995 | Todo et al. | 526/348.1 |
| 5,466,649 A | 11/1995 | Jejelowo | 502/120 |
| 5,468,702 A | 11/1995 | Jejelowo | 502/104 |
| 5,525,678 A | 6/1996 | Mink et al. | 525/246 |
| 5,616,665 A | 4/1997 | Jejelowo | 526/129 |
| 6,486,089 B1 * | 11/2002 | Kissin et al. | 502/104 |

OTHER PUBLICATIONS

Kaminsky, Walter, "Influence of Hydrogen on the Polymerization of Ethylene with the Homogeneous Ziegler System Bis(cyclopentadienyl)zirconiumdichloride/aluminoxane" Makromol. Chem. 225 (1984).

Kaminsky, Walter, "Isotactic Polymerization of Propene with (n–1,1'–ethylenedi–4,5,6,7–tetrahydroindenyl)zirconium dichloride Combined with Methylaluminoxane" Makromol. Chem. Rapid Commun. 8, 305–310 (1987).

Dissertation of Andresen with Translation, UV spektoskopische Untersuchungen . . . als Katalysatorkompohente, 1980.

Diplomarbeit of Kulper with Translation, "Homogene, Chlorhaltige . . . –von(CpMe5)2ZrCl2 . . . von Cp2ZrCl2 . . . von Ethen", 1981.

Dissertation of Hahnsen with Translation, "Kinetische und mechanistische . . . und Methylaluminoxan", 1985.

Dissertation of Kulper with Translation, "Polymerisationsverhalten von loslichen . . . gegenuber 1–Olefinen", 1985.

Herwig Dissertation with Translation Enclosed, "Olefinpolymerisation mit loslichen, . . . Aluminiumalkylkomponente".

Sinn et al., Agnew. Chem. Int. Ed. ENGL 19 (1980) 390–392.

Soga et al., Makromol Chem., Rapid Comm. 8, 305–310 (1987).

Kaminsky, W., "Metallocene Catalysts", University of Hamburg (1992).

* cited by examiner

BIMETALLIC CATALYST FOR ETHYLENE POLYMERIZATION REACTIONS WITH UNIFORM COMPONENT DISTRIBUTION

CROSS REFERENCE TO RELATED APPLICATIONS

This application is a continuation of U.S. Ser. No. 08/555,816, filed Nov. 9, 1995, now U.S. Pat. No. 6,486,089, the entire disclosure of which is expressly incorporated herein by reference.

FIELD OF THE INVENTION

The invention relates to the production of bimetallic catalyst systems for ethylene polymerization reactions. The catalysts contain two types of transition metals and produce polyethylene resins with broad and/or bimodal molecular weight distribution (MWD) in a single reactor. In a preferred embodiment, the invention relates to the production of titanium/zirconium-based bimetallic catalyst systems that produce broad and/or bimodal MWD polyethylene resins in a single reactor. In the most preferred embodiment, the low molecular weight (LMW) component in the resin is produced by the Zr active centers, while the high molecular weight (HMW) component is produced by the Ti active centers. The relative productivity of the two active centers determines the ratio of the HMW and the LMW components in the final resin.

This invention particularly relates to a new procedure for preparing bimetallic catalysts. This procedure results in bimetallic catalysts with a more uniform inter-particle distribution of the metals. With the increasing uniformity in inter-particle distribution of the metals, the gel content in polyethylene resins decreases. The bimetallic catalysts are used in (co)polymerization reactions to produce high molecular weight polyethylene product. Gels are attributable to high molecular weight components in the resins which are substantially greater in molecular weight than the surrounding matrix resin. The presence of gels in a resin results in poor appearance when the resin is fabricated into film. The presence of gels also interferes with the uniform printing on films. Films possessing very high gel levels also suffer in some film performance characteristics, such as tensile strength.

SUMMARY OF THE INVENTION

This invention relates to supported titanium-zirconium bimetallic catalysts with an improved inter-particle metal distribution of the Zr active centers and facilitates the scale-up of the catalysts.

This invention also includes a new procedure for preparing bimetallic catalysts. This procedure results in bimetallic catalysts with a more uniform inter-particle distribution of transition metal(s). The process comprises (1) providing silica which is porous and has a particle size of 1 to 250 microns, having pores which have an average diameter of 50 to 500 Angstroms and having a pore volume of 0.5 to 5.0 cc/g;

(2) slurrying the silica in an aliphatic solvent having a boiling point lower than 110° C.;

(3) providing a volume of a solution comprising a metallocene complex, alumoxane of formulas R—(Al(R)—O—)$_x$—AlR$_2$ for oligomeric linear alumoxanes and (—Al(R)—O—)$_y$ for cyclic alumoxanes wherein x is 1–40, y is 3–40, and R is a C$_1$–C$_8$ alkyl group in an aromatic solvent wherein the volume of the solution is lower than that required to form a slurry of said silica;

(4) contacting the silica with said volume of said solution (3) and allowing the solution to impregnate the pores of silica, and to disperse the metallocene complex in and on the carrier;

(5) evaporating solvents from the impregnated silica slurry, to recover dry free-flowing catalyst particles.

Catalyst Composition

The invention relates to a supported olefin (co) polymerization catalyst composition which is synthesized to uniformly disperse at least one transition metal component on the support. In preferred embodiments, the catalysts contain at least two transition metals, at least one in the form of a metallocene complex. A second transition metal on the support may be in the form of a non-metallocene component or a second metallocene complex, different from the first mentioned metallocene complex, but is preferably a non-metallocene compound. The catalyst compositions of the invention comprise a cocatalyst comprising an alkyl aluminum compound, such as a trialkylaluminum, free of alumoxane and free of oxygen-containing oligomers and polymers of the alkyl aluminum compounds, and a catalyst precursor comprising a carrier, an alumoxane and at least one metallocene; in one embodiment the catalysts further include a second transition metal source.

In accordance with the invention, these catalysts are made by a process for forming a carrier material impregnated with alumoxane and derivatives thereof comprising the steps (1) providing silica which is porous and has a particle size of 1 to 250 microns, having pores which have an average diameter of 50 to 500 Angstroms and having a pore volume of 0.5 to 5.0 cc/g;

(2) slurrying the silica in an aliphatic solvent having a boiling point less than 110° C., preferably by stirring at a temperature in the range of 20 to 25° C.;

(3) providing a volume of a solution comprising a metallocene, alumoxane of formulas R—(Al(R)—O—)$_x$—AlR$_2$ for oligomeric linear alumoxanes and (—Al(R)—O—)$_y$ for cyclic alumoxanes wherein x is 1–40, y is 3–40, and R is a C$_1$–C$_8$ alkyl group in an aromatic solvent, wherein the concentration of alumoxane, expressed as Al weight percent is 5 to 20; and wherein the volume of the solution is sufficient to impregnate the pores of silica without forming a slurry of the silica in the solvent;

(4) contacting the silica with said volume of said solution (3);

(5) evaporating solvents from the impregnated silica to recover dry free-flowing catalyst particles.

The metallocene complex becomes more uniformly distributed throughout the support as a result of steps (2) and (4). When two transition metal sources exhibiting different hydrogen responses in ethylene polymerization reactions are supported on the carrier subjected to the process of the invention, the result of the catalyst preparation process is an olefin polymerization catalyst composition which produces less gels in the polyethylene film produced from the polyethylene prepared with the catalyst composition. In the process of the invention, step (2) may be undertaken prior to or after (4).

The carrier material is a solid, particulate, porous, preferably inorganic material, such as an oxide of silicon and/or of aluminum. The carrier material is used in the form of a dry powder having an average particle size of from about 1 micron to about 500 microns, preferably from about 10 microns to about 250 microns. The surface area of the carrier is at least about 3 square meters per gram (m$^2$/g), and preferably at least about 50 m$^2$/g up to about 350 m$^2$/g. The carrier material should be free of absorbed water. Drying of the carrier material can be effected by heating at about 100° C. to about 1000° C., preferably at about 600° C. When the carrier is silica, it is heated to at least 200° C., preferably about 200° C. to about 850° C. and most preferably at about 600° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 600° C. for about 4–16 hours to achieve a surface hydroxyl group concentration of about 0.7 mmol/g. The silica of the most preferred embodiment is a high surface area, amorphous silica (surface area=300 m$^2$/g; pore volume of about 1.65 cm$^3$/g), and it is a material marketed under the tradenames of Davison 952 or Davison 955 by the Davison Chemical Division of W.R. Grace and Company. The silica is in the form of spherical particles and obtained by the spray-drying process. As procured, these silicas are not calcined; and this must be dehydrated, as indicated above.

The catalyst synthesis is undertaken under inert conditions in the absence of water and oxygen.

The carrier material having said OH groups is slurried in a non-polar solvent. The slurry of the carrier material is prepared by introducing the carrier into the solvent, preferably while stirring, and heating the mixture to about 25 to about 70° C., preferably to about 40 to about 60° C. Temperature of the slurry is critical with respect to the activity of the catalyst components added to it. All catalyst precursor synthesis steps should be conducted at temperatures below 90° C.

In embodiments of the invention, incorporation of the first transition metal component in the catalyst occurs prior to undertaking steps (3) and (4). In specific embodiments, incorporation of the first transition metal component involves a series of steps. Initially, the carrier is contacted with an organomagnesium compound which has the empirical formula $R_mMgR'_n$ where R and R' are the same or different $C_2$–$C_{12}$ alkyl groups, preferably $C_4$–$C_{10}$ alkyl groups, more preferably $C_4$–$C_8$ alkyl groups, and most preferably both R and R' are butyl groups, and m and n are each 0, 1 or 2, providing that m+n is equal to the valence of Mg. Optionally, but preferably, the organomagnesium-impregnated carrier is thereafter contacted with an alcohol and lastly with a non-metallocene transition metal source. Most preferably, these steps are undertaken in the order noted and without isolation of a dry product until after the non-metallocene transition metal compound incorporation.

Suitable non-polar solvents for slurrying silica and introduction of the first transition metal component are materials which are liquid at reaction temperatures and in which all of the reactants used herein, i.e., the organomagnesium compound, the alcohol and the transition metal compound, are at least partially soluble. Preferred non-polar solvents are alkanes, such as isopentane, hexane, isohexane, n-heptane, octane, nonane, and decane, although a variety of other materials including cycloalkanes, such as cyclohexane, aromatics, such as benzene, toluene and ethylbenzene, may also be employed. The most preferred non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity. In certain embodiments of the invention, two aliphatic solvents may be used, one for the incorporation of the non-metallocene transition metal and second aliphatic solvent for use in the incorporation of metallocene with an aromatic solvent. Accordingly, in the embodiment of titanium incorporation into the silica with the aliphatic solvent, that solvent will be referred as the first aliphatic solvent; and when an aliphatic solvent is used in conjunction with metallocene incorporation into the support, the aliphatic solvent will be referred as the second aliphatic solvent.

In the most preferred embodiment of the synthesis of this catalyst it is important to add only such an amount of the organomagnesium compound to the silica slurry that will be deposited, physically or chemically, onto the support since any excess of the organomagnesium compound in the solution may react with the other synthesis chemicals and precipitate outside of the support. The carrier drying temperature affects the number of sites on the carrier available for the organomagnesium compound: the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited onto the support without leaving any excess of the organomagnesium compound in the solution. Thus, the molar ratios given below are intended only as an approximate guideline and the exact amount of the organomagnesium compound in this embodiment must be controlled by the functional limitation discussed above, i.e., it must not be greater than that which can be deposited onto the support. The required amount of the organomagnesium compound can be determined in any conventional manner, e.g., by adding the organomagnesium compound to the slurry of the carrier in the solvent, while stirring the slurry, until the organomagnesium compound is detected in the solvent.

For example, for the silica carrier heated at about 600° C., the amount of the organomagnesium compound added to the slurry is such that the molar ratio of Mg to the hydroxyl groups (OH) on the solid carrier is about 0.5:1 to about 4:1, preferably about 0.8:1 to about 3:1, more preferably about 0.9:1 to about 2:1 and most preferably about 1:1. The organomagnesium compound dissolves in the non-polar solvent to form a solution from which the organomagnesium compound is deposited onto the carrier. The amount of the organomagnesium compound based on the amount of silica ranges from 0.2 mmol/g to 2 mmol/g, preferably from 0.4 mmol/g to 1.5 mmol/g, more preferably from 0.6 mmol/g to 1.0 mmol/g, and most preferably from 0.7 mmol/g to 0.9 mmol/g.

It is also possible to add the organomagnesium compound in excess of the amount deposited onto the support and then remove it, e.g., by filtration and washing. However, this alternative is less desirable than the most preferred embodiment described above.

The organomagnesium compound-treated support is contacted with an organic alcohol (ROH) containing RO groups which displace alkyl groups attached to the magnesium atom. The amount of the alcohol is effective to provide a ROH:Mg [mol/mol] ratio which ranges from 0.2 to 1.5, preferably from 0.4 to 1.2, more preferably from 0.6 to 1.1, most preferably from 0.9 to 1.0.

Contact of the silica-supported magnesium compound with the alcohol is also undertaken in the slurry at a temperature ranging from 25° C. to 80° C., preferably at 40° C. to 70° C.

The alkyl group in the alcohol can contain 1 to 12 carbon atoms, preferably 1 to 8; in the embodiments below, it is an alkyl group containing 2 to 4 carbon atoms, particularly four carbon atoms (n-butanol). The inclusion of the alcohol addition step in the catalyst synthesis of the invention produces a final catalyst which is much more active, requires much less non-metallocene transition metal compound (e.g., or titanium compound) and is much more active with respect to the the metallocene complex, as opposed to exclusion of the alcohol addition step.

After the addition of the alcohol to the slurry is completed, the slurry is contacted with the first source of transition metal, preferably non-metallocene transition metal compound. The slurry temperature at this stage must be maintained at about 25 to about 70° C., preferably to about 40 to about 60° C., because temperatures above 80° C. can result in deactivation of the non-metallocene transition metal component. Suitable non-metallocene transition metal compounds used herein are compounds of metals of Groups 4A, and 5A, of the Periodic Chart of the Elements, as published by Chemical and Engineering News, 63(5), 27, 1985, providing that such compounds are soluble in the non-polar solvents. Non-limiting examples of such compounds are titanium and vanadium halides, e.g., titanium tetrachloride ($TiCl_4$), vanadium tetrachloride ($VCl_4$), vanadium oxytrichloride ($VOCl_3$), titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is $TiCl_4$. The amount of titanium or vanadium ranges from a Ti/Mg molar ratio of 0.3 to 1.0, preferably from 0.50 to 0.80.

Mixtures of such transition metal compounds may also be used and generally no restrictions are imposed on the transition metal compounds which may be included. Any transition metal compound that may be used alone may also be used in conjunction with other transition metal compounds. After the addition of the first transition metal compound is completed, the solvent is removed by evaporation or filtering to obtain a free-flowing powder of the catalyst intermediate.

Next, incorporation of the metallocene transition metal compound into the catalyst intermediate is undertaken. The metallocene compound is pre-activated with an alkyl alumoxane.

Incorporation of the metallocene complex and its uniform distribution in the support is achieved in a mixed solvent system.

The metallocene compound has the formula $C_xMA_yB_z$ in which C is an unsubstituted or substituted cyclopentadienyl group, M is zirconium or hafnium atom and A and B belong to the group including a halogen atom, hydrogen atom or an alkyl group. In the above formula of the metallocene compound, the preferred transition metal atom M is zirconium. In the above formula of the metallocene compound, the C group is an unsubstituted, a mono- or a polysubstituted cyclopentadienyl group: and x is at least 1. The substituents on the cyclopentadienyl group can be preferably straight-chain $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when x in the above formula of the metallocene compound is equal to 2, the cyclopentadienyl groups can be also bridged by polymethylene or dialkylsilyl groups, such as —$CH_2$—, —$CH_2$—$CH_2$—, —CR'R"— and —CR'R"—CR'R"— where R' and R" are short alkyl groups or hydrogen atoms, —Si($CH_3$)$_2$—, Si($CH_3$)$_2$—$CH_2$—$CH_2$—Si($CH_3$)$_2$— and similar bridge groups. If the A and B substituents in the above formula of the metallocene compound are halogen atoms, they belong to the group of fluorine, chlorine, bromine or iodine; and y+z is 3 or less, provided that x+y+z equals the valence of M. If the substituents A and B in the above formula of the metallocene compound are alkyl groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl) metal hydridohalides, bis(cyclopentadienyl)metal monoalkyl monohalides, bis(cyclopentadienyl)metal dialkyls and bis(indenyl)metal dihalides wherein the metal is a zirconium or hafnium atom, halide groups are preferably chlorine and the alkyl groups are $C_1$–$C_6$ alkyls. Illustrative, but non-limiting examples of metallocenes include Bis(indenyl)zirconium dichloride, Bis(indenyl)zirconium dibromide, Bis(indenyl)zirconium bis(p-toluenesulfonate), Bis(4,5,6,7-tetrahydroindenyl) zirconium dichloride, Bis(fluorenyl)zirconium dichloride, Ethylene-bis(indenyl)zirconium dichloride, Ethylene-bis(indenyl)zirconium dibromide, Ethylene-bis(indenyl)dimethyl zirconium, Ethylene-bis(indenyl) diphenyl zirconium, Ethylene-bis(indenyl)methyl zirconium monochloride, Ethylene-bis(indenyl)zirconium bis(methanesulfonate), Ethylene-bis(indenyl) zirconium bis(p-toluenesulfonate), Ethylene-bis (indenyl)zirconium bis(trifluoromethanesulfonate), Ethylene-bis(4,5,6,7-tetrahydroindenyl)zirconium dichloride, Isopropylidene(cyclopentadienyl-fluorenyl) zirconium dichloride, Isopropylidene (cyclopentadienyl-methylcyclopentadienyl) zirconium dichloride, Dimethylsilyl-bis(cyclopentadienyl) zirconium dichloride, Dimethylsilyl-bis (methylcyclopentadienyl)zirconium dichloride, Dimethylsilyl-bis(dimethylcyclopentadienyl) zirconium dichloride, Dimethylsilyl-bis (trimethylcyclopentadienyl)zirconium dichloride, Dimethylsilyl-bis(indenyl)zirconium dichloride, Dimethylsilyl-bis(indenyl)zirconium bis (trifluoromethanesulfonate), Dimethylsilyl-bis(4,5,6,7-tetrahydroindenyl)zirconium dichloride, Dimethylsilyl (cyclopentadienyl-fluorenyl)zirconium dichloride, Diphenylsilyl-bis(indenyl)zirconium dichloride, Methylphenylsilyl-bis(indenyl)zirconium dichloride, Bis(cyclopentadienyl)zirconium dichloride, Bis (cyclopentadienyl)zirconium dibromide, Bis (cyclopentadienyl)methylzirconium monochloride, Bis (cyclopentadienyl)ethylzirconium monochloride, Bis (cyclopentadienyl)cyclohexylzirconium monochloride, Bis(cyclopentadienyl)phenylzirconium monochloride, Bis(cyclopentadienyl)benzylzirconium monochloride, Bis(cyclopentadienyl)zirconium monochloride monohydride, Bis(cyclopentadienyl)methylzirconium monohydride, Bis(cyclopentadienyl) dimethylzirconium, Bis(cyclopentadienyl) diphenylzirconium, Bis(cyclopentadienyl) dibenzylzirconium, Bis(cyclopentadienyl) methyoxyzirconium chloride, Bis(cyclopentadienyl) ethoxyzirconium chloride, Bis(cyclopentadienyl) zirconium bis(methanesulfonate), Bis (cyclopentadienyl)zirconium bis(p-toluenesulfonate), Bis(cyclopentadienyl)zirconium bis(trifluoromethanesulfonate), Bis(methylcyclopentadienyl)

zirconium dichloride, Bis(dimethylcyclopentadienyl) zirconium dichloride, Bis(dimethylcyclopentadienyl) ethoxyzirconium chloride, Bis(dimethylcyclopentadienyl)zirconium bis(trifluoromethanesulfonate), Bis(ethylcyclopentadienyl)zirconium dichloride, Bis (methylethylcyclopentadienyl)zirconium dichloride, Bis(propylcyclopentadienyl)zirconium dichloride, Bis (methylpropylcyclopentadienyl)zirconium dichloride, Bis(butylcyclopentadienyl)zirconium dichloride, Bis (methylbutylcyclopentadienyl)zirconium dichloride, Bis(methylbutylcyclopentadienyl)zirconium bis (methanesulfonate), Bis(trimethylcyclopentadienyl) zirconium dichloride, Bis(tetramethylcyclopentadienyl)zirconium dichloride, Bis (pentamethylcyclopentadienyl)zirconium dichloride, Bis(hexylcyclopentadienyl)zirconium dichloride, Bis (trimethylsilylcyclopentadienyl)zirconium dichloride, bis(cyclopentadienyl)zirconium dichloride, bis (cyclopentadienyl)hafnium dichloride, bis (cyclopentadienyl)zirconium dimethyl, bis (cyclopentadienyl)hafnium dimethyl, bis (cyclopentadienyl)zirconium hydridochloride, bis (cyclopentadienyl)hafnium hydridochloride, bis(n-butylcyclopentadienyl)zirconium dichloride, bis(n-butylcyclopentadienyl)hafnium dichloride, bis(n-butylcyclopentadienyl)zirconium dimethyl, bis(n-butylcyclopentadienyl)hafnium dimethyl, bis(n-butylcyclopentadienyl)zirconium hydridochloride, bis (n-butylcyclopentadienyl)hafnium hydridochloride, bis (pentamethylcyclopentadienyl)zirconium dichloride, bis(pentamethylcyclopentadienyl)hafnium dichloride, bis(n-butylcyclopentadienyl)zirconium dichloride, cyclopentadienylzirconium trichloride, bis(indenyl) zirconium dichloride, bis(4,5,6,7-tetrahydro-1-indenyl) zirconium dichloride, and ethylene-[bis(4,5,6,7-tetrahydro-1-indenyl)]zirconium dichloride.

The metallocene compounds utilized within the embodiment of this art can be used as crystalline solids or solutions in hydrocarbons.

Alumoxanes activate metallocene transition metal compounds. The class of alumoxanes comprises oligomeric linear and/or cyclic alkylalumoxanes represented by the formula: R—(Al(R)—O)$_n$—AlR$_2$ for oligomeric linear alumoxanes and (—Al(R)—O—)$_m$ for oligomeric cyclic alumoxanes wherein n is 1–40, preferably 10–20, m is 3–40, preferably 3–20 and R is a $C_1$–$C_8$ alkyl group, preferably methyl group. MAO (methylalumoxane) is a mixture of oligomers with a very wide distribution of molecular weights and usually with an average molecular weight of about 1200. MAO is typically kept in solution in toluene. In one embodiment, the amount of Al, provided by alumoxane, is sufficient to provide an Al:transition metal (provided by metallocene) mole ratio ranging from 50 to 500, preferably 75 to 300, more preferably from 85 to 200, and most preferably from 90 to 110.

In accordance with the invention, infusion of the metallocene complex admixed with alumoxane into the carrier is undertaken using the free-flowing powder containing a non-metallocene transition metal compound impregnated into the carrier. The free-flowing powder pre-slurried in a light aliphatic solvent. The pore volume of the carrier is determined and metallocene-alumoxane solution is provided in a volume equal to or less than the total pore volume of the carrier, and recovering a dry catalyst precursor.

The volume of the solution comprising the alumoxane, the metallocene complex and the aromatic solvent therefore can vary. In the preferred embodiment, the volume of the solution comprising the solvent and metallocene-aluminoxane ingredients is lower than that necessary to form a slurry of the carrier material, such as silica, but sufficient to fill the pores of the carrier material. Accordingly and preferably, the maximum volume of the alumoxane-metallocene solution does not exceed the total pore volume of the carrier material. We have found that up to 50% excess of a solvent volume over the total pore volume of the silica can be used without forming a slurry. Accordingly, if the pore volume of the carrier material is 1.65 cm$^3$/g, then the volume of alumoxane-metallocene solution will be equal to or less than 1.65 cm$^3$/gram of carrier material.

The solvent used to form this solution is one in which each of the metallocene, alumoxane, and activated mixtures thereof are soluble. Preferably, this solvent is an aromatic solvent selected from the group consisting of benzene, xylene or toluene. The most preferred solvent is toluene.

As indicated above, incorporation and uniform dispersion of the metallocene complex in the carrier involves a solvent system consisting of at least two solvents. In accordance with the invention, the first solvent used during the addition of RMgR', ROH and TiX$_4$ to silica, to form a Ziegler type catalyst intermediate, has a boiling point below 110° C. Preferably, the solvent is aliphatic; it may consist of straight or branched chain hydrocarbons with 4 to 7 carbon atoms. Examples include isobutane, pentane, isopentane, hexane, isohexanes, heptane, isoheptanes, methylene dichloride, or chloroform.

The second aliphatic solvent is used to slurry the catalyst intermediate and to receive or to disperse the solution containing the source of metallocene compound in an aromatic solvent. It has a boiling point of less than about 90° C. Preferably, its boiling point ranges from −50 to 89° C.; more preferably from −25 to 70° C., and most preferably from −5 to 50° C.; in the most preferred embodiments the boiling point of this solvent is in the range of from 10 to 35° C.

The second aliphatic solvent is used in the amount required to produce a slurry with a solids content ranging from 10 to 40%, preferably from 15% to 35%. The liquid medium in the final step of catalyst preparation comprises a volume ratio of the light aliphatic solvent to the aromatic solvent which ranges from 0.5 to 20, preferably from 1.0 to 15, more preferably from 2.0 to 10, most preferably from 2.5 to 8. The slurry is agitated to insure good mixing while the solution of metallocene compound and alumoxane is added to the slurry of the carrier material.

The second aliphatic solvent is evaporated from the slurry to isolate a free-flowing powder containing two sources of transition metal without any filtering. Filtering is avoided to substantially eliminate the loss of catalytic components. The solvent is removed by evaporation at relatively low temperatures, in the range above 40° C. and below about 50° C. Very short heating time schedules are employed to obviate catalyst degradation.

In a preferred embodiment, the metallocene is added to the solution of the alumoxane prior to impregnating the carrier with the solution. Again, as noted above, the maximum volume of the alumoxane solution also including the metallocene compound should not exceed the total pore volume of the carrier material. The molar ratio of alumoxane, expressed as Al, to metallocene metal expressed as M (e.g. Zr), ranges from 50 to 500, preferably 75 to 300, and most preferably 100 to 200. An added advantage of the present invention is that this Al:Zr ratio can be directly controlled. In a preferred embodiment the alumoxane and metallocene compound are mixed together at a temperature of about 20 to 80° C., for 0.1 to 6.0 hours, prior to use in the infusion step. The solvents for the metallocene compound and alumoxane can be hydrocarbons or halogenated aromatic hydrocarbons, preferably it is toluene.

The catalyst precursor component formed from the organomagnesium compound, the non-metallocene transition metal and the activated metallocene complex, must be activated with a cocatalyst, which is an alkylaluminum compound free of oxygen-containing MAO oligomers. Preferably, trimethylaluminum (TMA) is the cocatalyst. The amount of TMA is sufficient to give an Al:Ti molar ratio of about 10:1 to about 1000:1, preferably about 15:1 to about 300:1, and most preferably about 20:1 to about 100:1. The activated catalyst composition exhibits high activity for long periods of time and shows little deactivation.

The catalyst precursor of this invention comprises a non-metallocene transition metal component, metallocene compound and an alumoxane. It is fed to the fluidized-bed reactor for gas phase polymerization and copolymerization reactions of ethylene in the absence of alumoxane solution.

For the production of ethylene copolymers in the process of the present invention an operating temperature of about 30° to 115° C. is preferred and a temperature of about 75° to 100° C. is most preferred. Temperatures of about 75° to 90° C. are used to prepare products having a density of about 0.91 to 0.92, temperatures of about 80° to 100° C. are used to prepare products having a density of about 0.92 to 0.94, and temperatures of about 90° to 115° C. are used to prepare products having a density of about 0.94 to 0.96.

The fluidized-bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a point above the distribution plate of a fluidized bed reactor at a rate equal to its consumption. Since the catalysts used in the practice of this invention are highly active, injection of the fully activated catalyst into the area below the distribution plate may cause polymerization to begin there and eventually cause plugging of the distribution plate. Injection into the polymer particle bed, instead, aids in distributing the catalyst throughout the bed and precludes the formation of localized areas of high catalyst concentration. Under a given set of operating conditions, the fluidized-bed is maintained at essentially a constant height by withdrawing a portion of the bed as product at a rate equal to the rate of formation of the particulate polymer product.

The production rate of polymer in the bed is controlled by the rate of catalyst injection. Since any change in the rate of catalyst injection changes the rate of generation of the heat of reaction, the temperature of the recycle gas is adjusted to accommodate the change in rate of heat generation. Complete instrumentation of both the fluidized bed and the recycle gas cooling system is necessary to detect any temperature changes in the bed so as to enable the operator to make a suitable adjustment in the temperature of the recycle gas.

Since the rate of heat generation is directly related to the product formation, a measurement of the temperature rise of the gas across the reactor (the difference between the inlet gas temperature and the exit gas temperature) is determinative of the rate of particulate polymer formation at a constant gas velocity.

EXAMPLES

Example 1

Titanium component: Into a 200 gallon mix vessel containing a helical stirrer was added Davison-grade 955 silica (61.0 lb), which was previously calcined at 600° C. for 4 h, and isopentane (138 liter). The agitator speed was set at 100 rpm and the internal temperature of the vessel was set at 50–55° C. Dibutylmagnesium solution in heptane (DBM, 19.9 mol) was added to the stirred silica/isopentane slurry and stirring was continued for one hour. 1-Butanol (18.91 mol) was added to the slurry and stirring was continued for 1 h. Then, $TiCl_4$ (11.94 mol) was added to the reaction medium and stirring was continued for 1 h. Then the agitator speed was reduced to 40 rpm and all solvent was removed by evaporation with a nitrogen purge to provide a gree-flowing light tan powder. Elemental analyses: Ti, 1.66 wt %; Mg, 1.36 wt %.

Comparative Example

Bimetallic Catalyst: The dry titanium component from Example 1 (366.5 g) was placed into a 2-gallon glass vessel containing a helical stirrer which was set at 150 rpm. To this dry powder at ambient temperature was added a toluene solution (617 ml) containing MAO (8.00 mmol Al/g titanium component) and bis(n-butylcyclopentadienyl) zirconium dichloride [$(n-BuCp)_2ZrCl_2$] (11.85 g) over a period of about 15 minutes. After one hour, the internal temperature was increased to about 45° C. and solvent was removed with a nitrogen purge for 5 h to provide a brown free-flowing powder. Elemental analyses: Ti, 0.99 wt %; Zr, 0.46 wt %.

Example 2

Bimetallic Catalyst: The dry titanium component from Example 1 (372 g) was placed into a 2-gallon glass vessel containing a helical stirrer which was set at 150 rpm. About 1860 ml of isopentane was added to the glass vessel. Then, at ambient temperature was added a toluene solution (627 ml) containing MAO (8.00 mmol Al/g titanium component) and $(n-BuCp)_2ZrCl_2$ (12.02 g) over a period of about 15 minutes. After one hour, the internal temperature was increased to about 45° C. and solvent was removed with a nitrogen purge for 5 h to provide a brown free-flowing powder. Elemental analyses: Ti, 0.99 wt %; Zr, 0.44 wt %.

Example 3

Polymerization: The catalyst of Example 2 was added to a fluidized-bed polymerization reactor under the following polymerization conditions: Reactor temperature 90° C., ethylene partial pressure 180 psi, hydrogen/ethylene ratio in vapor phase 0.01, 1-hexene/ethylene weight ratio fed to the reactor, 0.025, TMA feed relative to ethylene feed 200 ppm.

Example 4

Polymerization: The catalyst of Comparative Example was added to a fluidized-bed polymerization reactor under the same polymerization conditions as in Example 3.

The polymers produced in Example 3 and 4 were compounded on a 2½" Brampton single-screw extruder and fabricated into 1.0 mil film on a 50-mm Alpine blown film line. The films were then ranked for gel level using the film quality rating (FQR), a qualitative measure of the gel amount. The minimum 10 FQR rating is assigned to essentially gel free film, while a 60 FQR is the maximum rating for films with high gel levels. A 30 FQR is considered the maximum commercially acceptable rating.

The catalyst of Example 2 produced a resin with significantly lower gels than catalyst of Comparative Example.

| Catalyst Example | Activity g/g | Polymer Example | Flow Index (I$_{21}$) | MFR | Resin Density g/cc | FQR |
| --- | --- | --- | --- | --- | --- | --- |
| Comparative 2 | 2880 2750 | 4 5 | 6.9 9.5 | 109 123 | 0.949 0.950 | 60 25 |

MFR is the ratio $I_{21}/I_2$ (wherein $I_{21}$ is measured at 190° C. in accordance with ASTM D-1238, Condition F, and $I_2$ is measured in accordance with ASTM D-1238, Condition E).

Thus it is apparent that there has been provided, in accordance with the invention, a catalyst and its preparation process that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for preparing a bimetallic catalyst, the process comprising:
    (a) providing a supported non-metallocene catalyst by:
        (i) preparing a slurry of a dehydrated support in a non-polar hydrocarbon;
        (ii) contacting the slurry of (i) with an organomagnesium compound RMgR', where R and R' are the same or different $C_2$–$C_{12}$ alkyl groups;
        (iii) contacting the slurry of (ii) with a non-metallocene compound of a Group 4 or Group 5 transition metal; and
        (iv) drying the product of (iii) to obtain a supported non-metallocene catalyst;
    (b) contacting a slurry of the supported non-metallocene catalyst in a non-polar hydrocarbon with a solution of a metallocene compound and a $C_1$–$C_8$ alkyl alumoxane in an aromatic solvent; and
    (c) drying the product of (b) to obtain a supported bimetallic catalyst.

2. The process of claim 1, wherein the support material is silica.

3. The process of claim 1, wherein the non-polar hydrocarbon in (a) is selected from the group consisting of $C_4$–$C_{10}$ linear or branched alkanes, cycloalkanes and aromatics.

4. The process of claim 1, wherein the organomagnesium compound is dibutylmagnesium.

5. The process of claim 1, wherein the organomagnesium compound is used in an amount of from 0.2 mmol to 2 mmol organomagnesium compound per gram of dehydrated support material.

6. The process of claim 1 further comprising before step (iii), contacting the slurry of (ii) with an alcohol R"OH, wherein R" is a $C_1$–$C_{12}$ alkyl group.

7. The process of claim 6, wherein the alcohol is n-butanol.

8. The process of claim 6, wherein the alcohol is used in an amount of 0.2 to 1.5 moles per mole of magnesium provided by the organomagnesium compound.

9. The process of claim 1, wherein the Group 4 or 5 transition metal is titanium or vanadium.

10. The process of claim 1, wherein the non-metallocene transition metal compound is a titanium halide, a titanium alkoxide, a vanadium halide, a vanadium oxyhalide or a vanadium alkoxide.

11. The process of claim 1, wherein the non-metallocene transition metal compound is used in an amount to provide from 0.3 to 1.0 moles of the Group 4 or 5 transition metal per mole of magnesium provided by the organomagnesium compound.

12. The process of claim 1, wherein the metallocene compound is a substituted, unbridged bis-cyclopentadienyl compound.

13. A process for preparing a bimetallic catalyst, the process comprising:
    (a) providing a supported non-metallocene titanium catalyst by:
        (i) preparing a slurry of a dehydrated silica in a non-polar hydrocarbon;
        (ii) contacting the slurry of (i) with dibutylmagnesium;
        (iii) contacting the slurry of (ii) with n-butanol;
        (iv) contacting the slurry of (iii) with titanium tetrachloride; and
        (v) drying the product of (iv) to obtain a supported non-metallocene titanium catalyst;
    (b) contacting a slurry of the supported non-metallocene titanium catalyst in a non-polar hydrocarbon with a solution of a zirconium or hafnium metallocene compound and methylalumoxane in an aromatic solvent; and
    (c) drying the product of (b) to obtain a supported bimetallic catalyst.

14. The process of claim 13, wherein the non-polar hydrocarbon in (a) is selected from the group consisting of $C_4$–$C_{10}$ linear or branched alkanes, cycloalkanes and aromatics.

15. The process of claim 13, wherein the dibutylmagnesium is used in an amount of from 0.2 mmol to 2 mmol dibutylmagnesium compound per gram of dehydrated silica.

16. The process of claim 13, wherein the n-butanol is in an amount of 0.2 to 1.5 moles per mole of dibutylmagnesium.

17. The process of claim 13, wherein the titanium tetrachloride is used in an amount to provide from 0.3 to 1.0 moles of titanium per mole of dibutylmagnesium.

18. The process of claim 13, wherein the metallocene compound is a substituted, unbridged bis-cyclopentadienyl compound.

* * * * *